United States Patent
Shaffer et al.

(10) Patent No.: US 9,491,295 B2
(45) Date of Patent: Nov. 8, 2016

(54) SYSTEM AND METHOD FOR SELECTING AGENT IN A CONTACT CENTER FOR IMPROVED CALL ROUTING

(71) Applicant: Avaya Inc., Santa Clara, CA (US)

(72) Inventors: Shmuel Shaffer, Palo Alto, CA (US); Reinhard P. Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/674,560

(22) Filed: Mar. 31, 2015

(65) Prior Publication Data

US 2015/0207938 A1 Jul. 23, 2015

Related U.S. Application Data

(63) Continuation of application No. 13/789,190, filed on Mar. 7, 2013, now abandoned, and a continuation of application No. 12/724,971, filed on Mar. 16, 2010.

(51) Int. Cl.
*H04M 3/00* (2006.01)
*H04M 5/00* (2006.01)
*H04M 3/523* (2006.01)

(52) U.S. Cl.
CPC ....... *H04M 3/5233* (2013.01); *H04M 2201/18* (2013.01); *H04M 2203/555* (2013.01)

(58) Field of Classification Search
CPC ........... H04M 3/5233; H04M 3/5232; H04M 2203/40; H04M 2203/408
USPC ............ 379/265.11, 265.05, 265.12, 265.01; 705/304; 706/12; 370/352
See application file for complete search history.

(56) References Cited

U.S. PATENT DOCUMENTS

| | | |
|---|---|---|
| 6,175,564 B1 | 1/2001 | Miloslavsky et al. |
| 6,389,400 B1 | 5/2002 | Bushey et al. |
| 6,430,597 B1 | 8/2002 | Dilip et al. |
| 6,871,322 B2 | 3/2005 | Gusler et al. |
| 6,978,247 B1 | 12/2005 | Bogart et al. |
| 7,023,980 B2 | 4/2006 | Lenard |
| 7,088,813 B1 | 8/2006 | Brand et al. |
| 7,353,182 B1 | 4/2008 | Missinhoun et al. |
| 7,382,773 B2 | 6/2008 | Schoeneberger et al. |
| 7,536,322 B1 | 5/2009 | Selinger et al. |
| 7,836,405 B2 | 11/2010 | Bushey et al. |

(Continued)

OTHER PUBLICATIONS

Bahl, Sangeeta; Office Action; U.S. Appl. No. 12/978,904; Aug. 16, 2012; United States Patent and Trademark Office; Alexandria, Virginia.

(Continued)

*Primary Examiner* — Thjuan K Addy

(57) ABSTRACT

An agent selection system for selecting agents during call routing in a contact center is provided. The agent selection system includes a data mining module to mine agent related data from preconfigured resources e.g., social networking sites. The agent selection system further includes a profile module to build one or more agent profile based on the mined agent related data. The agent selection system further includes a mapping module configured to map a customer profile in a customer work request with the one or more agent profile. The agent selection system further includes a selection module to select an agent for handling the customer work request based on mapping between the customer profile and the one or more agent profile.

20 Claims, 6 Drawing Sheets

(56) References Cited

U.S. PATENT DOCUMENTS

| | | | |
|---|---|---|---|
| 7,890,363 | B2 | 2/2011 | Gross |
| 8,050,394 | B2 | 11/2011 | Fotta et al. |
| 8,112,391 | B2 | 2/2012 | Allen et al. |
| 8,180,646 | B2 | 5/2012 | Jaiswal et al. |
| 8,380,555 | B2 | 2/2013 | Kohler et al. |
| 8,935,804 | B1 | 1/2015 | Clark et al. |
| 2004/0141508 | A1 | 7/2004 | Schoeneberger et al. |
| 2005/0182672 | A1 | 8/2005 | Hemm et al. |
| 2007/0083418 | A1 | 4/2007 | Quiring et al. |
| 2008/0056233 | A1* | 3/2008 | Ijidakinro ......... H04L 29/06027 370/352 |
| 2009/0117883 | A1 | 5/2009 | Coffing et al. |
| 2010/0027778 | A1 | 2/2010 | Kumar et al. |
| 2010/0169159 | A1 | 7/2010 | Rose et al. |
| 2010/0185871 | A1 | 7/2010 | Scherrer et al. |
| 2010/0235218 | A1 | 9/2010 | Erhart et al. |
| 2010/0241577 | A1* | 9/2010 | Geppert ................ G06Q 10/10 705/304 |
| 2011/0123015 | A1 | 5/2011 | Erhart et al. |
| 2011/0179114 | A1 | 7/2011 | Dilip et al. |
| 2012/0089698 | A1 | 4/2012 | Tseng |
| 2012/0166345 | A1 | 6/2012 | Klemm |
| 2013/0159224 | A1* | 6/2013 | Blake ................ G06Q 30/0201 706/12 |
| 2013/0170637 | A1 | 7/2013 | Klemm et al. |
| 2014/0254790 | A1 | 9/2014 | Shaffer et al. |

OTHER PUBLICATIONS

Bahl, Sangeeta; Final Office Action; U.S. Appl. No. 12/978,904; Dec. 20, 2012; United States Patent and Trademark Office; Alexandria, Virginia.

Bahl, Sangeeta; Office Action; U.S. Appl. No. 12/978,904; Feb. 6, 2015; United States Patent and Trademark Office; Alexandria, Virginia.

Bahl, Sangeeta; Final Office Action; U.S. Appl. No. 12/978,904; Oct. 3, 2015; United States Patent and Trademark Office; Alexandria, Virginia.

Bahl, Sangeeta; Office Action; U.S. Appl. No. 13/789,160; Oct. 8, 2015; United States Patent and Trademark Office; Alexandria, Virginia.

Bahl, Sangeeta; Office Action; U.S. Appl. No. 12/724,971; May 23, 2012; United States Patent and Trademark Office; Alexandria, Virginia.

Bahl, Sangeeta; Final Office Action; U.S. Appl. No. 12/724,971; Sep. 28, 2012; United States Patent and Trademark Office; Alexandria, Virginia.

Bahl, Sangeeta; Office Action; U.S Appl. No. 12/724,971; Feb. 28, 2013; United States Patent and Trademark Office; Alexandria, Virginia.

Bahl, Sangeeta; Final Office Action; U.S. Appl. No. 12/724,971; Sep. 13, 2013; United States Patent and Trademark Office; Alexandria, Virginia.

Bahl, Sangeeta; Office Action; U.S. Appl. No. 12/724,971; Dec. 18, 2013; United States Patent and Trademark Office; Alexandria, Virginia.

Bahl, Sangeeta; Office Action; U.S. Appl. No. 12/724,971; Aug. 14, 2014; United States Patent and Trademark Office; Alexandria, Virginia.

Bahl, Sangeeta; Final Office Action; U.S. Appl. No. 12/724,971; Mar. 11, 2015; United States Patent and Trademark Office; Alexandria, Virginia.

Bahl, Sangeeta; Office Action; U.S. Appl. No. 12/724,971; Nov. 25, 2015; United States Patent and Trademark Office; Alexandria, Virginia.

Addy, Thjuan Knowlin; Office Action; U.S. Appl. No. 13/789,190; Sep. 13, 2013; United States Patent and Trademark Office; Alexandria, Virginia.

Addy, Thjuan Knowlin; Final Office Action; U.S. Appl. No. 13/789,190; Jan. 16, 2014; United States Patent and Trademark Office; Alexandria, Virginia.

Addy, Thjuan Knowlin; Office Action; U.S. Appl. No. 13/789,190; Sep. 3, 2014; United States Patent and Trademark Office; Alexandria, Virginia.

Addy, Thjuan Knowlin; Final Office Acition; U.S. Appl. No. 13/789,190; Jan. 30, 2015; United States Patent and Trademark Office; Alexandria, Virginia.

Bahl, Sangeeta; Final Office Action; U.S. Appl. No. 13/789,160; May 6, 2016; United States Patent and Trademark Office; Alexandria, Virginia.

Bahl, Sangeeta; Final Office Action; U.S. Appl. No. 12/724,971; Jul. 1, 2016; United States Patent and Trademark Office; Alexandria, Virginia.

Bahl,Sangeeta; Office Action; U.S. Appl. No. 121978,904; Sep. 8, 2016; United States Patent and Trademark Office; Alexandria, Virginia.

* cited by examiner

SYSTEM AND METHOD FOR SELECTING AGENT IN A CONTACT CENTER FOR IMPROVED CALL ROUTING

CROSS-REFERENCE TO RELATED APPLICATIONS

This application is a continuation of, and claims the benefit of, U.S. patent application Ser. No. 13/789,190 filed Mar. 7, 2013, entitled "SYSTEM AND METHOD FOR SELECTING AGENT IN A CONTACT CENTER FOR IMPROVED CALL ROUTING," which is incorporated herein by reference in its entirety. This application is also a continuation-in-part of, and claims the benefit of, U.S. patent application Ser. No. 12/724,971 filed Mar. 16, 2010, entitled "METHOD FOR ROUTING USERS TO CONTACT CENTER AGENTS," which is incorporated herein by reference in its entirety.

BACKGROUND

1. Field

Embodiments of the present invention generally relate to a system and method for providing customer service and particularly to a system and method for selecting an agent during call routing.

2. Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. Contact center efficiency is generally measured in two ways.

Service level is one measurement of contact center efficiency. Service level is typically determined by dividing the number of contacts accepted within the specified period by the number accepted plus the number that were not accepted, but completed in some other way (e.g., abandoned, given busy, cancelled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

Traditional contact center technology matches incoming calls to agents based on a combination of knowledge about the customer (business-internal CRM data plus dynamic data retrieved at the beginning of the call), the customer's request, agent availability, agent skill sets, and other factors during the call routing process. Agent scripting software uses the same knowledge about customers and customer service requests as the call routing software.

Traditional call routing and agent scripting rely on sparse, if any, information about callers and coarse-grained customer service requests as well as agent skill sets during the call routing process and agent scripting. Caller information is based on business CRM records and additional caller self-disclosure at the beginning of the call. Customer service requests are mostly as detailed as a short IVR menu or pull-down menu in a web form allows. Such information provides only a small window into callers' preferences, personalities, interests, preferences, handicaps, cultural backgrounds, and into the actual reason for the call. Likewise, agent skill sets are very coarse-grained, highly static, and largely reflect only few dimensions of the agents' true skills, expertise, limitations, and personalities, and are predicated on equally coarse-grained customer service requests (account information, products and services, mailing address, get help etc.).

However, traditional call routing technology does not allow for fine-grained skill set definitions, and assessing agents' detailed skill sets would be a highly time-consuming, costly, and tedious process. The traditional call routing technologies fall short of fine-grained matching of calls (and callers) with agents. Further, there is large impedance between availability of fine-grained customer profiles, even if available, and customer service requests on the one hand and coarse-grained agent skill sets on the other hand.

There is thus a need for an improved customer support service system and method for selecting suitable agents for improved call routing.

SUMMARY

Embodiments in accordance with the present invention provide an agent selection system for selecting agents during call routing in a contact center. The agent selection system includes a data mining module to mine agent related data from preconfigured resources e.g., social networking sites. The agent selection system further includes a profile module to build one or more agent profiles based on the mined agent related data. The agent selection system further includes a mapping module configured to map a customer profile in a customer work request with the one or more agent profiles. The agent selection system further includes a selection module to select an agent for handling the customer work request based on mapping between the customer profile and the one or more agent profile.

Embodiments in accordance with the present invention further provide a computer-implemented method for selecting agents during call routing in a contact center. The computer-implemented method includes mining agent related data from preconfigured resources, building one or more agent profile based on the mined agent related data, mapping a customer profile in a customer work request with the one or more agent profile, and selecting an agent for handling the customer work request based on mapping between the customer profile and the one or more agent profile.

Embodiments in accordance with the present invention further provide a computer readable medium storing computer readable instructions when executed by a processor performs a method. The method includes mining agent related data from preconfigured resources, building one or more agent profile based on the mined agent related data, mapping a customer profile in a customer work request with the one or more agent profile, and selecting an agent for handling the customer work request based on mapping between the customer profile and the one or more agent profile.

Embodiments of the present invention can provide a number of advantages depending on the particular configuration. First, embodiments of the present invention provide fine-grained matching of attributes between the callers into a contact center and their specific customer service requests on the one hand and agents on the other hand during call routing process. In embodiments of the present invention, the fine-grained matching is based on pre-existing social media data about the customers and agents, and requires no extra effort on the part of the customer or the agent of the contact center.

To support fine-grained matching, embodiments of the present invention may retrieve and analyze customer and agent data that is available on one or more social networks. The data may include data ranging from static data to highly dynamic data. Examples of static data would be profile information including name, gender, age, education, location, and so forth. Semi-static data, i.e., data with a higher degree of dynamicity, may include hobbies, TV interests, friends, and so forth. Dynamic data includes social network posts, for example customer posts on his/her Facebook Wall or to the company's Facebook page, agent tweets on Twitter, customer location, presence, and availability. From this set of data, an embodiment of the present invention compiles a profile of both the agent and the customer. The profile includes static, semi-static data and dynamic data as outlined above as well as user characteristics that can be inferred from the body of retrieved data and that may have some bearing on the matching process between customer and agent. In particular, social network posts allow inferences about user characteristics.

Of particular interest are user characteristics that fall into the categories "personality," "conversation style," and "attitude toward the company." Examples of relevant personality characteristics may be grumpy, cheerful, polite, astute, perceptive, quick, methodical, and the opposites thereof. Examples of conversation style may be verbose, eloquent, concise, uses good diction, explains well, talkative, and the opposites thereof. Examples of "attitude toward the company" may include hostile, friendly, neutral.

An objective of providing a fine-grained, dynamic matching of the customer profile with the agent skill sets is to provide more effective, efficient and/or pleasant customer service interactions, and consequently improved customer satisfaction. Embodiments of the invention allow contact centers to set up criteria to measure a quality of match, or correlation, of agent and customer attributes based upon agent and customer profiles. Hence, embodiments of the present invention increase customer satisfaction as well as agent job satisfaction that further reduce agent turnover and new agent training costs.

Further, embodiments of the present invention continuously trawl online, public social networks, and automatically update the persona of agents of the contact center. Hence, embodiments of the present invention provide an optimized matching between the callers into a contact center and their specific customer service requests on the one hand and agents on the other hand during call routing process based on the current data as well as continuously updated data.

These and other advantages will be apparent from the disclosure of the invention(s) contained herein.

The preceding is a simplified summary of the present invention intended to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
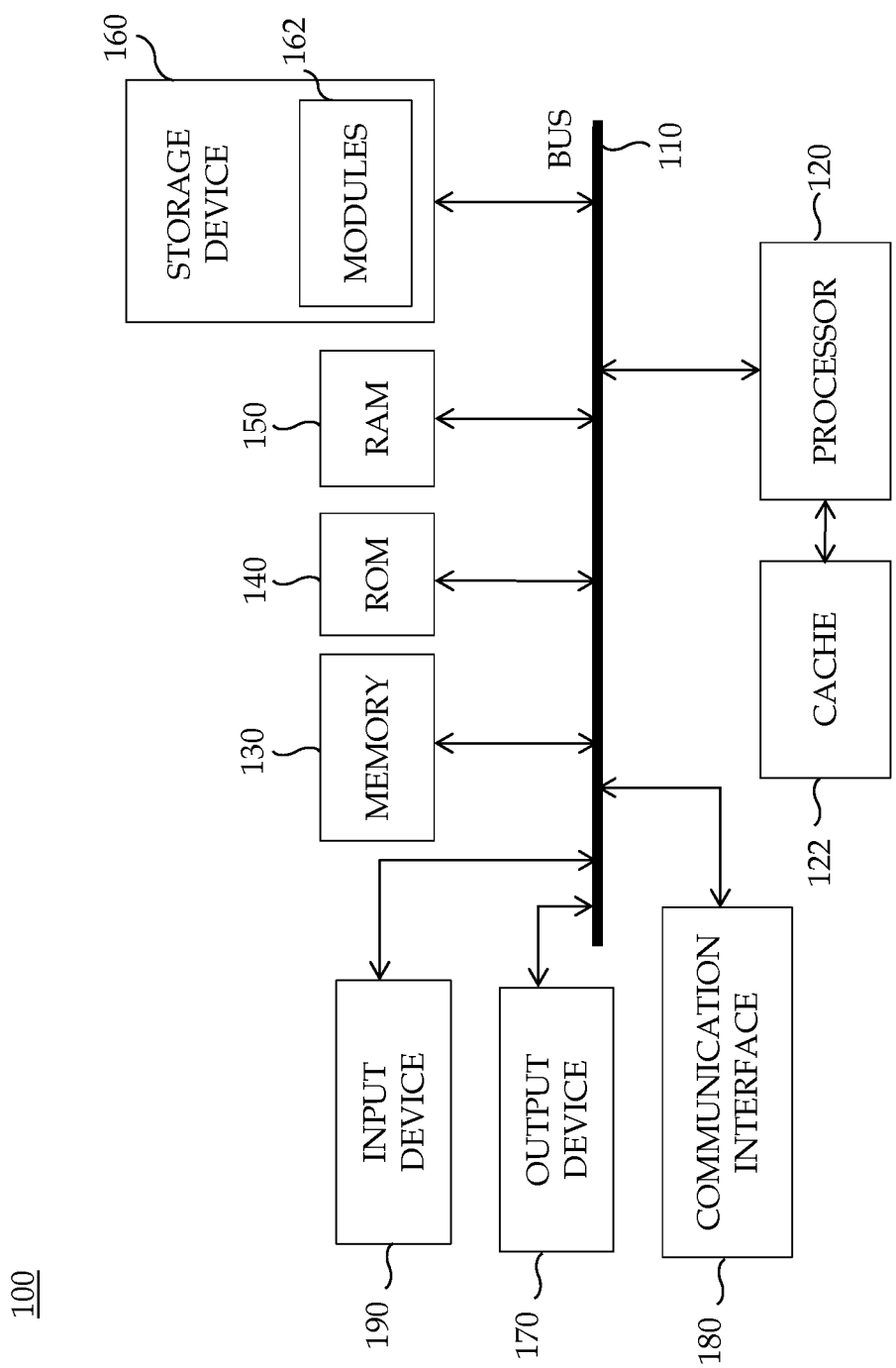
FIG. 1 illustrates an example system embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an ACD or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments of the present invention include a tangible storage medium or distribution medium and prior art-recognized equivalents and successor media, in which the software implementations of embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while embodiments of the present invention are described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

With reference to FIG. 1, an exemplary system includes a general-purpose computing device 100, including a system bus 110 and a processing unit (CPU or processor) 120 that couples various system components including the system memory 130 such as read only memory (ROM) 140 and random access memory (RAM) 150 to the processor 120. The system may include a cache 122 of high speed memory connected directly with, in close proximity to, or integrated as part of the processor 120. The system copies data from the memory 130 and/or the storage device 160 to the cache 122 for quick access by the processor 120. In this way, the cache 122 provides a performance boost that avoids the processor 120 delays while waiting for data. These and other modules may control or be configured to control the processor 120 to perform various actions. Other system memory 130 may be available for use as well. The memory 130 may include multiple different types of memory with different performance characteristics. It may be appreciated that the disclosure may operate on a computing device 100 with more than one processor 120 or on a group or cluster of computing devices networked together to provide greater processing capability. The processor 120 may include any general purpose processor and a hardware module or software module 162 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in read only memory (ROM) 140 or the like, may provide the basic routine that helps to transfer information between elements within the computing device 100, such as during start-up. The computing device 100 further includes storage device 160 such as a hard disk drive, a magnetic disk drive, an optical disk drive, tape drive or the like. The storage device 160 may include software module 162 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one embodiment of the present invention, a hardware module that performs a particular function includes the software component stored in a computer-readable medium in connection with the necessary hardware components, such as the processor 120, bus 110, output device 170, and so forth, to carry out the function. The basic components are known to those of skill in the art and appropriate variations are contemplated depending on the type of device, such as whether the computing device 100 is a small, handheld computing device, i.e., a smart phone, a desktop computer, or a computer server.

Although the exemplary embodiment described herein employs the hard disk 160, it should be appreciated by those skilled in the art that other types of computer readable media which may store data that are accessible by a computer, such as magnetic cassettes, flash memory cards, digital versatile disks, cartridges, read only memory (ROM) 140, random access memories (RAM) 150, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 180 represents any number of input mechanisms, such as a microphone for speech, a touch-sensitive screen for gesture or graphical input, keyboard, mouse, motion input, speech and so forth. An output device 170 may also be one or more of a number of output mechanisms known to those of skill in the art. In some instances, multimodal systems enable a user to provide multiple types of input to communicate with the computing device 100. Communication interface 190 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. Further, use of the term "processor" should not be construed to refer exclusively to hardware capable of executing software. Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system shown in FIG. 1 may practice all or part of the recited methods, may be a part of the recited systems, and/or may operate according to instructions in the recited non-transitory computer-readable storage media. Such logical operations may be implemented as modules configured to control the processor 120 to perform particular functions according to the programming of the module. For example, FIG. 1 illustrates the software module 162 in the storage device 160 configured to control the processor 120. These modules may be stored on the storage device 160 and loaded into random access memory (RAM) 150 or memory 130 at runtime or may be stored as would be known in the art in other computer-readable memory locations.

Figure 2:
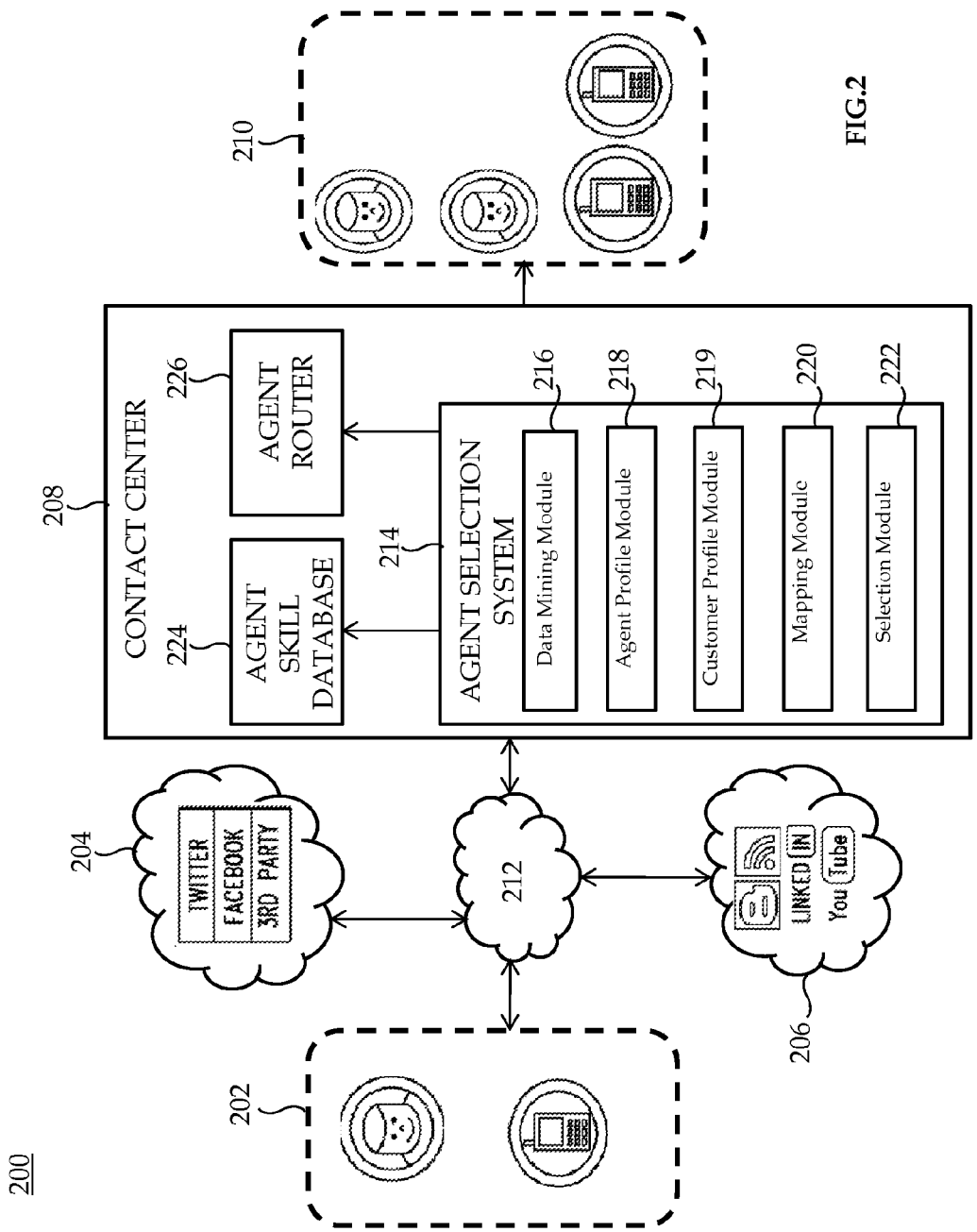
FIG. 2 illustrates an exemplary architecture in which the various embodiments may be implemented.

Having disclosed some components of a computing system, the disclosure now turns to FIG. 2, which illustrates a network environment 200 in which the various embodiments of the present invention may be implemented. As shown in FIG. 2, the network environment 200 includes user terminal 202 associated with customers, direct social media channel 204 (with respect to the contact center), indirect social media channels 206 (with respect to the contact center), a contact center 208, and an agent terminal 210. The elements 202-208 may be connected via at least one network 212.

The network environment 200 includes a user terminal 202 connected to a contact center 208 via network 212. According to an embodiment of the present invention, the user terminal 202 may include a computing device 100 of the user, for example, a smart phone, a laptop, a desktop, a tablet etc. The network 212 may include, but is not restricted to, a communication network such as the Internet, PSTN, Local Area Network (LAN), Wide Area Network (WAN), Metropolitan Area Network (MAN), and so forth. In an embodiment of the present invention, the network 212 may be a data network such as the Internet.

In the various embodiments of the present invention, the contact center 208 may be configured to support a variety of communication modes. For example, the contact center 208 may be configured to support real-time communication modes. That is, communication modes which are "live" or in which there is no appreciable latency between the user and the agent communication. Such communication modes may include telephony communications (land-line and mobile), instant messaging, Internet relay chat (IRC) or other chatting modes, video-conference, teleconference, or tele-presence, to name a few. However, the various embodiments are not limited in this regard and any other type of real-time communication mode may also be used.

Alternatively, or in combination with real-time communication modes, the contact center 208 may also be configured to support time-shifted communication modes. That is, communication modes in which messages between the users and the agents are stored at some intermediate point. For example, such communication modes may include email, electronic message boards, social networks, or any other communication mode in which messages from the agent to the user or the user to the agent are stored at some intermediate point, allowing the recipient to access the messages without the need to maintain an active communication link with the sender.

The contact center 208 may be configured to support the communication modes described above using a wide variety of devices for the user terminal 202, including devices operating over analog or digital communication channels designed for the delivery of information to users in an audio form, a visual form (including static and dynamic visual elements), or any combination thereof. For example, in some embodiments of the present invention, the contact center 208 may be configured to support the user terminal 202 consisting of a general purpose computer device connected to the data network 212, as described above with respect to FIG. 1. Such devices may include a desktop computer, portable computer, personal digital assistant, smart phone, or any other type of appliance or device having access to one or more data networks supporting real-time and/or time-shifted communication modes over such networks. However, the various embodiments are not limited in this regard. For example the user terminal 202 may be devices supporting real-time and/or time-shifted communications over telephony networks or any other type of communication networks. Such devices may include land-line telephone devices, mobile or cellular telephone devices, videophone devices, and the like. However, the various embodiments are not limited in this regard and any other types of devices may be used for user terminal 202.

Further, in another embodiment of the present invention, the user terminal 202 and the contact center 208 may communicate in various ways. In one embodiment of the present invention, the user makes use of the user terminal 202 to establish a communication session with the contact center 208. For example, the customer may establish a telephony communication link with the contact center 208. In another embodiment of the present invention, the customer may establish a communication session with the contact center 208 over a videophone, instant messaging, or other real-time communications means.

As shown in FIG. 2, social media channel 204 and 206 are accessible through the network 212 and consist of direct and indirect social media channels, respectively, with respect to the contact center 208. As used herein, a "direct" social media channel refers to a social media channel that is directly related or associated with the contact center 208. For example, the social media channel may be a publically accessible communications channel that is managed and controlled by the customer care center of the contact center 208, such as a customer support user forum established and managed by the contact center 208. However, in the various embodiments, such direct social media channel 204 may also include online communications channels which are partially managed or controlled by the contact center 208. For example, a Facebook® or Twitter® site or page established by the contact center 208. However, the various embodiments are not limited to the examples above and a direct social media channel 204 may include any other type of communication channel in which the content is at least partially managed or controlled by the contact center 208.

In contrast, an "indirect" social media channel refers to a social media channel in which the contact center 208 is a participant and is not involved in the management, establishment, or control thereof. Such indirect social media channels 206 may include channels that are viewable by the general public, including channels requiring registration or having some type of authentication procedures for accessing the channel. For example, a blog or other online communications channel established by one or more customers of the contact center 208. In such a communication channel, the contact center 208 may monitor and interact with customers, but others may control the content in the communication channel. However, the various embodiments are not limited to the examples above and an indirect social media channel may include any other type of communication channel in which the contact center does not have control of the content posted thereon.

In yet another embodiment of the present invention, one or more time-shifted communications may first occur, followed by a real-time communication session between the customer and the agent of the contact center 208. For example, a customer may utilize user terminal 202 to indicate their desire to establish a communication session with an agent of the contact center 208. Such an indication may be by way of providing a message or post on a social network site, by sending an email to the contact center 208, or providing the indication via any other type of time-shifted communication means.

Additionally, the network environment 200 may include agent terminal 210 associated with agents of the contact center 208 and configured for providing services to the customers located at the user terminal 202. In particular, the contact center 208 connects and manages the communication link or session between the user terminal 202 and the agent terminal 210. Although the agent terminal 210 are shown in FIG. 2 as being connected to the network 212 via the contact center 208, the various embodiments are not limited in this regard. Rather, in some embodiments of the present invention, one or more of the agent terminal 210 may be directly connected to the network 212 and may communicate with the contact center 208 via network 212. The agent terminal 210, like the user terminal 202 may be configured to support real-time and/or time-shifted communication modes. Accordingly, the description above regarding the communication modes and devices for the user terminal 202 is equally applicable to the agent terminal 210.

Further, according to an embodiment of the present invention, the contact center (or enterprise) 208 includes an agent selection system 214, agents skill database 224, a rules database (not shown in Figure), and an agent router 226. The agent selection system 214 includes a data mining module 216, an agent profile module 218, a customer profile module 219, a mapping module 220, and a selection module 222.

The data mining module 216 is configured to mine agent related data from preconfigured resources. In one embodiments of the present invention, the agent related data is obtained by the contact center 208 in several ways and from several sources. A primary source for collecting the agent data may be the contact center 208 itself. However, information included in the agent data may provide a limited view of the overall characteristics of the agent, specifically the characteristics of the agent with respect to the contact center 208.

Accordingly, in another embodiments of the present invention, a secondary source of agent data is utilized, i.e., social media channels. In particular, the contact center 208 is configured to access and monitor social media channel 204, 206 for agent data. Such social media channels may include direct social media channel 204 or indirect social media channel 206, as described above, and social media channels associated with a same or a different domain as compared to the domain of the contact center 208. As a result, the agent data collected may add additional aspects of the agent's interest. Thus, the agent data may more accurately reflect the overall characteristics of the agent and allows the contact center 208 to provide more customized customer services to the customers. In some embodiments, only public information may be gathered regarding the agent. In some embodiments, the gathered information may include both public and at least some non-public information. The gathering and usage of any non-public information may be with the consent of the agent, either expressly or implied as a condition of employment, using access codes, etc., supplied by the agent.

In an embodiment of the present invention, the data mining module 216 is configured to retrieve users' context indicating questions, inquiries, concerns, problems, and dislikes regarding products, services, and businesses from social network sites. According to an embodiment of the present invention, the data mining module 216 relies on configurable keywords to identify relevant user posts on social network sites. The data mining module 216 is also configured to classify the identified user posts into 'n' most frequent topics where 'n' is a configurable parameter. According to another embodiment of the present invention, the data mining module 216 is also configured to retrieve common answers to such user posts as far as they exists. Further, the retrieved answers to the user posts may be compiled as a list of common answers for each of the retrieved topic. According to yet another embodiment of the present invention, the data mining module 216 is further configured to retrieve topics and answers from social media presence of competing, complementary, and partner businesses.

Further, the data mining module 216 may operate as a data aggregator collecting information regarding the agents' interactions from social media channel 204 and 206. Such aggregation may be provided in several ways. For example, the data mining module 216 may include a data collection or aggregation engine to perform the aggregation itself. Alternatively, or in combination with such an aggregation engine, the data mining module 216 may be configured to operate with other modules, internal or external to the contact center 208, for collecting data regarding the agents. For example, the data mining module 216 may be configured to operate with a third party aggregator system (not shown) connected to the network 212.

Furthermore, the agent selection system 214 in the contact center 208 may be used to at least partially analyze the collected agent's data. For example, the agent selection system 214 may include a data analysis engine to identify Spam or irrelevant customer's context with respect to agent's data, to rank the information according to a relevance to a particular criterion, or to classify information according to subject, topic, product, and/or any other classification scheme. The agent selection system 214 may also be configured to store the final, relevant agent information in agent skill database 224.

The agent profile module 218 is configured to build profile of agents in the contact center 208 based upon mined agent-related data. The profile of the agent of the contact center 208 may be based upon social media data about the agent available on a social network site, subject to certain legal, ethical, and individual agent restrictions. The agent profile module 218 is configured to build agent profiles that may include agent's self-description, social circles, posts, likes, locations, etc. According to an embodiment of the present invention, the social media data may be retrieved by the data mining module 216 periodically at configurable intervals.

The customer profile module 219 is configured to build a profile of a customer who is in contact with the contact center 208, based upon mined customer-related data. The customer profile may be based upon social media data about the customer available on a social network site, and gathered subject to certain legal, ethical, privacy, and individual customer restrictions or permissions. The customer profile module 219 may determine the customer's static attributes (age, gender, name, location, language, etc.) and inferred personality, conversation style, attitude towards this company, etc., based on what the profile module can retrieve about the customer from online resources, including social media channels. The data retrieved from/about the customer could be publicly available (social network posts, blog posts, some social network profile information, etc.), or could also be nonpublic data if the customer consents to have his/her nonpublic data retrieved from such sources.

In yet another embodiment of the present invention, the agent profile module 218 is configured to incorporate the retrieved agent media content into extended agent skill sets. The extended skill sets of the agent may include agent's interests, education and work histories, hobbies, home-towns, favorite sport teams and TV shows, cultural background, and so on. The agent's social media posting history may reveal a lot about the agent's skills related to the business (e.g., interest in and proficiency in solving mobile device problems), eloquence, communication style (e.g., youthful, mature, techy, trendy, conservative, in-depth), enthusiasm, and other personality traits that may have a bearing on customer service. The agent skill set is updated that may include the results obtained by the data mining module 216 into the extended agent skill set. The profile of the agent of the contact center 208 is updated automatically at configurable intervals or as soon as agent related data from mining process is available. Agent related data may include data ranging from static data to highly dynamic data. Examples of static data would be profile information including name, gender, age, education, location, and so forth. Semi-static data, i.e., data with a higher degree of dynamicity, may include hobbies, TV interests, friends, and so forth. Dynamic data includes social network posts, for example posts on his/her Facebook Wall or to the company's Facebook page, and agent tweets on Twitter. From this set of data, an embodiment of the present invention compiles a profile of the agent. The profile includes static and semi-static data as outlined above as well as user characteristics that can be inferred from the body of retrieved data and that may have some bearing on the matching process between customer and agent.

In an embodiment, the term "agent skill set" may refer to a set of agent data that is used by the contact center to characterize an agent. Such agent data can include biographical agent data, demographic agent data, and external or internal behavioral agent data, to name a few. The behavioral data can include the agent's history with respect to the contact center and/or any other entity or social media channel. However, the agent data is not limited in this regard and can include any other type of agent data used by the contact center to characterize or classify agents. Further, the agent data can include any other agent data collected from one or more sources external to the contact center. Additionally, the agent profile can be raw data or processed agent data. That is, the agent data can be analyzed to characterize the agent and thereafter used to provide customized or personalized services to the user/customer. For example, an agent profile can be a set of values associated with a agent and a set of characteristics, where the values are selected based on the agent data obtained. However, the disclosure is not limited in this regard and any other methods for evaluating agent data to provide services that can be used without limitation.

The mapping module 220 is configured to map customer profile elements to extended agent skill set elements. The mapping of the customer profile to the extended agent skill set is based on predefined rules stored in the rules database. Further, the mapping module 220 is configured to use a set of rules set up by the contact center 208. The rules are based on available customer profile elements; agent profile elements, available extended skill set elements, and topics and answers as compiled by the data mining module 216.

In some embodiments, the rules may also consider the personality and conversational styles of both the customer and the agent, and the attitude of the customer towards the company. At least some traits may be matched for similarity in order to help provide a sense of comfort to the customer. For example, a customer with an outgoing personality may be matched to an agent with a similar outgoing personality, or a customer with a southern accent may be matched to an agent with a southern accent. In some situations it may be desirable to match a customer with an agent having a somewhat different yet complementary trait. For example, a verbose customer may be matched to a less verbose agent, so that the call may proceed more efficiently. A customer whose social network posts show a hostile attitude may be matched with an agent whose soothing personality is well-suited to calm down an angry customer.

According to an embodiment of the present invention, the mapping module 220 is further configured to specify what constitutes a good match between a customer and a customer service requests containing a topic on one hand and an extended agent skill set on the other hand. According to yet another embodiment of the present invention, the mapping module 220 is further configured to compute a matching score between the customer and agents who are available or may be available shortly in the contact center 208. The matching score is based on how many rules may be applied to a given customer-agent combination. If all or nearly all of the customer profile elements match with the agent profile elements, then the customer-agent combination may get the highest score. Otherwise, the customer-agent combination may get scores based on the number of matching elements in the two profiles.

In some embodiments in accordance with the present invention, mapping module 220 may use a vector matching technique in order to find a preferred agent. Individual attributes useful to help match a caller with an agent may be represented as individual elements of a multi-dimensional vector. Attributes of a caller, either self-identified or as mined from social networking sources, may be mapped to a customer vector. Attributes of agents in contact center 208, either self-identified or as mined from social networking sources, may be mapped to a respective agent vector. Vector matching may then be used to correlate the caller with a plurality of agents, in order to find a preferred matching agent. The vector representation may account for differences in weighting among vector elements, and a function for each vector element may be provided that maps a degree of mismatch in an attribute to a weight contribution by that element. For attributes whose values are unknown for the caller and/or agent, the vector matching technique may ignore that particular attribute.

The selection module 222 is configured to select an agent based on the mapping between customer profile and the agent profile. In an embodiment, selection module 222 selects an agent with the highest score. The agent with the highest score based on the mapping criteria may be selected by a call routing process (e.g., agent router 226) to handle customer work request and provide customer services.

As also shown in the network environment 200, the connection between the user terminal 202 and agent terminal 210 is provided via agent routing module in an agent router 226. In response to a user at the user terminal 202 selecting a particular contact option, the agent router 226 establishes the communication link associated with the selected contact option between the user terminal 202 and the agent terminal 210.

Figure 3:
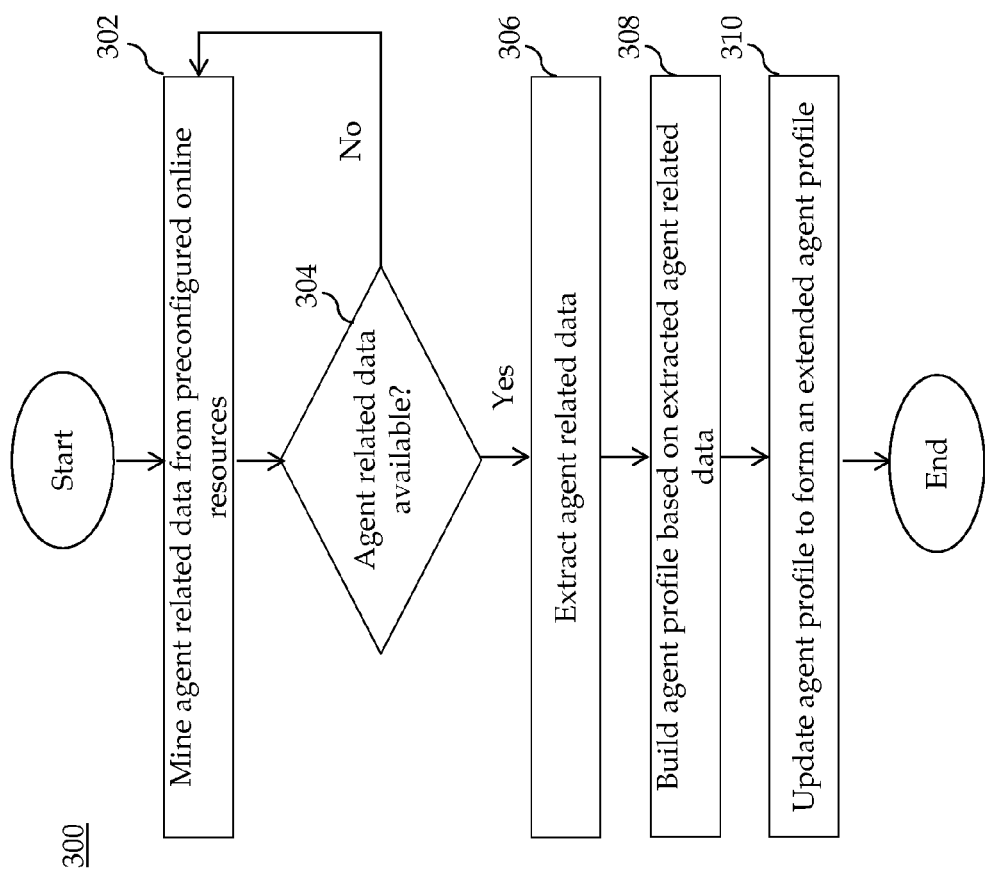
FIG. 3 illustrates a flowchart depicting an embodiment of the present invention.

FIG. 3 illustrates a method 300 for building an agent's profile using data mined from preconfigured resources.

At step 302, agent related data is mined from preconfigured online resources. In an embodiment of the present invention, the agent related data is mined from social networks, blogs, online question/answer forums (e.g., social media) for user posts. In an embodiment, the agent related data includes user posts. The user posts may include more frequent topics such as, questions, inquiries, concerns, problems, and dislikes regarding products, services, and businesses.

At step 304, it is determined whether agent related data is available. If the agent related data is available on the user posts, the method proceeds towards step 306. Otherwise, the method 300 returns to step 302.

At step 306, agent related data is extracted. At step 308, agents profile is built based on mined agent related data. In an embodiment of the present invention, the contact center 208 may build an agent profile based on the agent related data available on business CRM records or may be by additional self disclosure at the beginning of career. The agent profile may be based on agent related data about the agent, subject to certain legal, ethical, and individual agent restrictions. The agent data in the agent profile may include agent's self description i.e., name, gender, age etc. In yet another embodiment of the present invention, the agent related data is periodically retrieved at configurable intervals.

At step 310, agent profile is updated based on retrieved data. In an embodiment of the present invention, extended agent skill set elements of the agent retrieved from the social media may be integrated in the agent profile. The extended agent skill set may include agents' interests, education and work histories, hobbies, locations, hometowns, favorite sport teams and TV shows, cultural background, and so on. Further, an agent's post in response to a user's post may reveal a lot about the agent's skills related to the business (e.g., interest in and proficiency in solving mobile device problems), eloquence, communication style (e.g., youthful, mature, techy, trendy, conservative, in-depth), enthusiasm, and other personality traits that may have a bearing on customer service.

Figure 4:
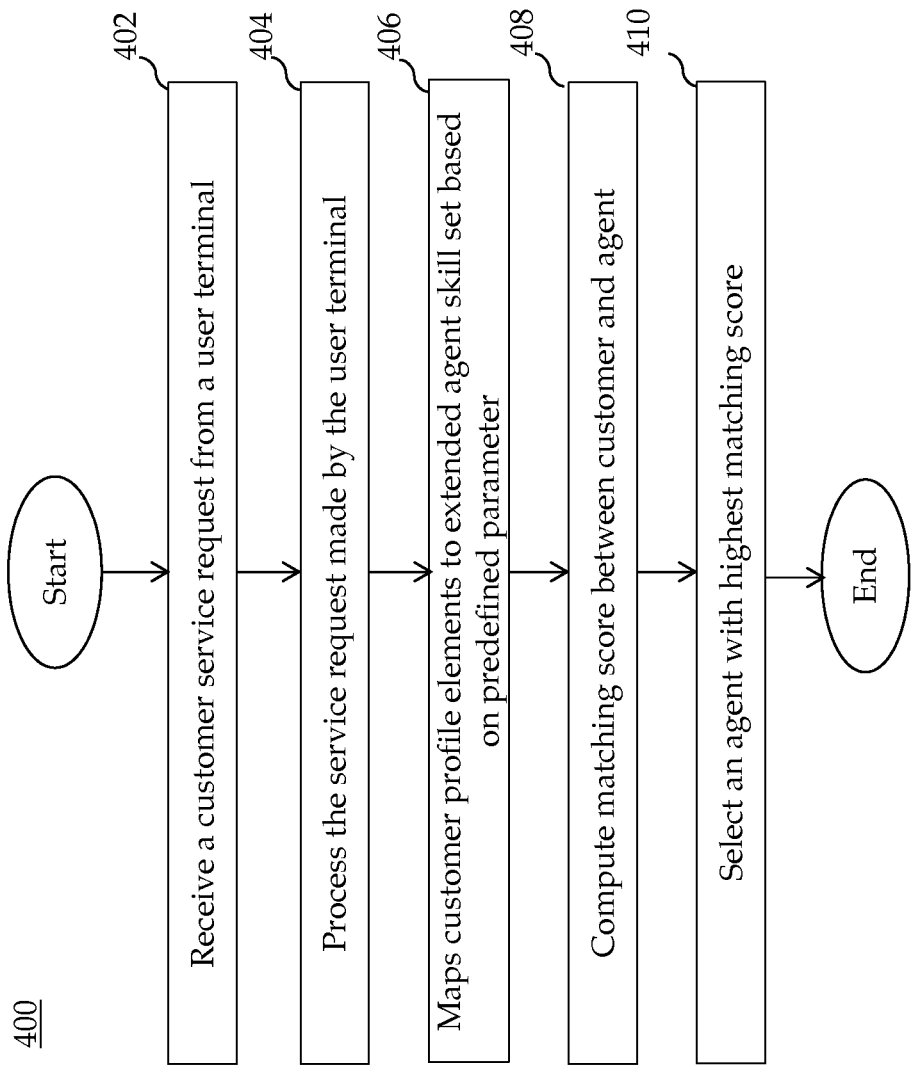
FIG. 4 illustrates a flowchart depicting an embodiment of the present invention.

FIG. 4 illustrates a method 400 for matching agent skills with customer profiles for improved call routing.

At step 402, a customer service request is received by a contact center 208 from a user terminal 202. In an embodiment of the present invention, a customer service request may be made by making a telephone call to the contact center 208. In another embodiment of the present invention, the customer may request for a work request by sending text messages, emails, web chats, submitted Web support form, a voice call, or video call.

At step 404, the customer work request received from the user terminal 202 is processed for providing customized service to the customer. In an embodiment, the customer work request may be processes to determine a type of call e.g., telephone call, text message, email, etc. Further, customer related data may be retrieved and detailed customer profile elements may be generated.

At step 406, the contact center 208 maps the customer profile elements to extended agent skill set elements. The mapping of the customer profile elements to extended agent skill set elements is based on predefined rules. The agent selection system 214 uses the predefined rules based on available customer profile elements, available extended skill set elements, and topics and answers as compiled by the data miner. Further, the set of rules may also specify what constitutes a good match between the customer and the customer service requests containing a topic on the one hand and the extended agent skill set on the other hand. For example, the contact center 208 may pair an irate, Spanish-speaking, wealthy, middle-aged, technology-savvy, male caller from Miami with a complaint about a non-working data connection on his smart phone with a Spanish-speaking, middle-aged, female expert solving mobile device problems and who has a history of soothing irate customers without talking down to them. Further, the agent's hometown may also be considered in the pairing decision because if an agent with hometown in or near Miami may be found, initial small talk about their common location may make the customer feel more at ease with the agent.

At step 408, a matching score is computed between the customer profile and available agent profile. In an embodiment of the present invention, the agent selection system 214 at the contact center 208 may compute a matching score of the customer-agent combination. The contact center 208 matches the customer profile elements with the extended agent skill set elements of the available agents in the contact center 208. The agents of the contact center 208 may then assign a matching score based on the mapping of available customer profile elements to extended agent skill set elements. The agent having highest mapped elements with the customer profile elements may be assigned with the highest matching score. If fewer customer profile elements are mapped to the extended agent skill set elements, e.g., if the number of profile elements being mapped are less than a predetermined threshold, then an agent may be assigned with a lower score.

At step 410, the contact center 208 may select an agent for providing customer service to the customer. In one embodiment of the present invention, the contact center 208 may select the agent based on assigned matching score. The agent with the highest matching score is selected to provide customer service.

Figure 5:
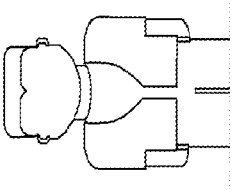
FIG. 5 illustrates an exemplary agent's profile page.

FIG. 5 illustrates agent's profile page on an exemplary social network site. As shown in FIG. 5, the profile page 500 of the agent on the social network site may provide information to the contact center 208 to retrieve information to facilitate customer service. According to an embodiment of the present invention, the profile page 500 of the agent on the social network site may include the agent's name, gender, work and home location, language, Facebook friends, education level, work history, favorite TV shows, books, or music. However, the various embodiments are not limited in this regard and other types of user data may also be provided without limitation.

The profile page 500 of the agent on the social network site may also include additional information elements. For example, as shown in FIG. 5, the additional information elements may include additional characteristics of the agent, such as personal facts, schooling, hobbies, and beliefs, to name a few. As a result, this information may help the contact center 208 to build extended agent skill set to improve matching between the customer and the agent of the contact center 208.

Figure 6:
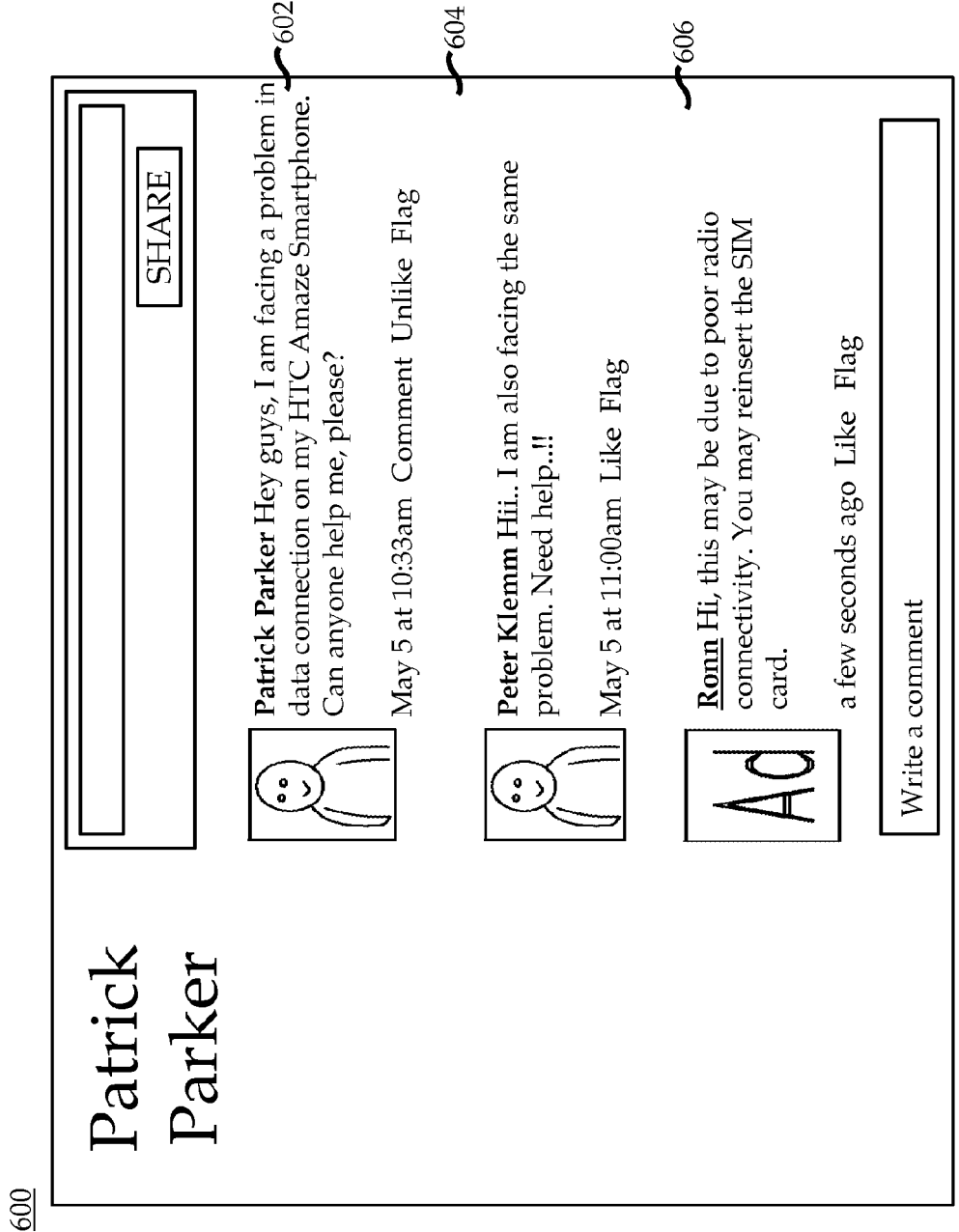
FIG. 6 illustrates an exemplary agent's comments on a user's post on a social network site.

FIG. 6 illustrates agent's comment on a post on a social network site, which may be used to update the persona of the agent. The agent may have commented on the users posts 602 and 604 on the social network site. The contact center 208 may retrieve the post of the agent 606 and consider it as an agent data to characterize agent interest and expertise on a particular topic. The contact center 208 may use this data to build agent profile having extended agent skills set along with the information about the agents' hobbies, expertise, limitations, true skills, and personalities.

The exemplary systems and methods of this present invention have been described in relation to a user device (e.g. smart device). However, to avoid unnecessarily obscuring embodiments of the present invention, the preceding description omits a number of known structures and devices. This omission is not to be construed as a limitation of the scope of the claimed invention. Specific details are set forth to provide an understanding of embodiments of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for embodiments of the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of embodiments of the present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although embodiments of the present invention describe components and functions implemented in the embodiments with reference to particular standards and protocols, embodiments of the present invention is not limited to such standards and protocols. Other similar standards and protocols not mentioned herein are in existence and are considered to be included in embodiments of the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in embodiments of the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use embodiments of the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of embodiments of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An agent computer selection system for selecting agent computers during call routing in a contact center, comprising:
   a memory device storing executable instructions, and
   a processor in communication with the memory device, wherein the processor when executing the executable instructions:
   mines respective agent related data from preconfigured resources for each of a plurality of agents of the contact center,
     wherein each of the plurality of agents is associated with a respective agent computer, and
     wherein the preconfigured resources comprise social networking sites;
   builds a respective agent profile for each of the plurality of agents based on the mined agent related data;
   maps a customer profile in a customer work request with one or more of the respective agent profiles; and
   selects one of the respective agent computers for handling the customer work request based on the mapping with the customer profile and the one or more respective agent profiles.

2. The agent computer selection system of claim 1, wherein the respective agent related data comprises data posted by that agent on the social networking sites.

3. The agent computer selection system of claim 1, wherein the processor when executing the executable instructions utilizes preconfigured keywords to identify and mine respective agent related data from the preconfigured resources.

4. The agent computer selection system of claim 1, wherein the processor when executing the executable instructions updates the respective agent profile based on the mined respective agent related data.

5. The agent computer selection system of claim 1, wherein the processor when executing the executable instructions prepares, for each of the plurality of agents, a respective extended agent skill set based on the mined respective agent related data.

6. The agent computer selection system of claim 5, wherein each of the respective extended agent skill sets comprises one or more interests of that agent, education and work histories of that agent, hobbies of that agent, a geographic location of that agent, a hometown of that agent, one or more favorite sports teams of that agent, one or more favorite TV shows of that agent, and a cultural background of that agent.

7. The agent computer selection system of claim 5, wherein each of the respective extended agent skill sets comprises one or more skills of that agent related to business, eloquence of that agent, communication style of that agent, enthusiasm of that agent, and one or more personality traits of that agent.

8. The agent computer selection system of claim 5, wherein the processor when executing the executable instructions maps customer profile elements of the customer profile to extended agent skill set elements of each of the respective extended agent skill sets based on predefined mapping rules stored in a rules database.

9. The agent computer selection system of claim 8, wherein the predefined mapping rules relate to identifying whether there is a match between the customer profile elements and the extended agent skill set elements.

10. The agent computer selection system of claim 1, wherein the processor when executing the executable instructions computes a respective matching score based on the mapping between the customer profile and each of the one or more respective agent profiles.

11. The agent computer selection system of claim 10, wherein the processor when executing the executable instructions determines the respective agent profile with a highest respective matching score and selects the associated agent computer.

12. The agent computer selection system of claim 10, wherein the processor when executing the executable instructions determines a respective agent profile having less than a highest respective matching score and selects the associated agent computer when the highest matching score is less than a predetermined threshold.

13. A computer-implemented method for selecting agent computers during call routing in a contact center, the computer-implemented method comprising:
  mining, by a computer of the contact center, respective agent related data from preconfigured resources for each of a plurality of agents of the contact center,
    wherein each of the plurality of agents is associated with a respective agent computer and,
    wherein the preconfigured resources comprise social networking sites;
  building, by the computer of the contact center, a respective agent profile for each of the plurality of agents based on the mined agent related data;
  mapping, by the computer of the contact center, a customer profile in a customer work request with one or more of the respective agent profiles; and
  selecting, by the computer of the contact center, one of the respective agent computers for handling the customer work request based on the mapping between the customer profile and the one or more respective agent profiles.

14. The computer-implemented method of claim 13, wherein the respective agent related data comprises data posted by that agent on the social networking sites.

15. The computer-implemented method of claim 13, wherein mining respective agent related data comprises:
  mining agent related data from the preconfigured resources based on preconfigured keywords.

16. The computer-implemented method of claim 13, wherein building respective agent profiles comprises:
  preparing for each of the plurality of agents a respective extended agent skill set based on the mined respective agent related data.

17. The computer-implemented method of claim 16, wherein each respective extended agent skill set comprises a name of that agent, a gender of that agent, a home location of that agent, a work location of that agent, an education level of that agent, a work history of that agent, one or more favorite TV shows of that agent, one or more favorite books of that agent, favorite music of that agent, one or more hobbies of that agent, a list of friends of that agent, a name of a spouse of that agent, one or more posts from that agent, one or more comments from that agent, a communication style of that agent, an eloquence of that agent, an enthusiasm of that agent, and one or more personality traits of that agent.

18. The computer-implemented method of claim 13, wherein mapping a customer profile comprises:
  computing a respective matching score based on the mapping between the customer profile and each of the one or more respective agent profiles.

19. The computer-implemented method of claim 18, wherein the step of selecting an agent computer comprises:
  selecting the agent computer associated with the respective agent profile with a highest matching score.

20. A system in a contact center for selecting agent computers during call routing in a contact center, the computer-implemented method comprising:
  a telecommunications device receiving a customer work request for the contact center from a customer computer;
  a first memory device storing a database of a respective agent profile for each of a plurality of agents of the contact center,
    wherein each respective agent profile is based at least in part on agent-related data mined from a plurality of social media channels; and
    wherein each of the plurality of agents is associated with a respective agent computer;
  a server computer, comprising:
    a second memory device storing executable instructions, and
    a processor in communication with the first memory device and the second memory device, wherein the processor when executing the executable instructions:
      maps a customer profile associated with the customer work request with one or more of the respective agent profiles;
      computes a respective matching score based on the mapping between the customer profile and each of the one or more respective agent profiles; and
      selects the one of the respective agent computers associated with the respective agent profile with a highest matching score;
  an agent router establishing a communications link between the customer computer and the selected one agent computer; and
  a network medium coupled with the telecommunications device, the first memory device, the server computer, and the agent router.

* * * * *